United States Patent [19]
Puthawala

[11] Patent Number: 6,056,858
[45] Date of Patent: May 2, 2000

[54] GASIFICATION DEVICE

[75] Inventor: Anwer Puthawala, Buckenhof, Germany

[73] Assignee: Siemens Aktiengesellschaft, Munich, Germany

[21] Appl. No.: 09/160,870

[22] Filed: Sep. 25, 1998

Related U.S. Application Data

[63] Continuation of application No. PCT/EP97/01333, Mar. 17, 1997.

[30] Foreign Application Priority Data

Mar. 28, 1996 [DE] Germany .......................... 196 12 288

[51] Int. Cl.[7] ...................................................... C25B 9/00
[52] U.S. Cl. ........................... 204/258; 204/264; 204/266; 204/270; 204/276; 204/278
[58] Field of Search ..................................... 204/278, 276, 204/258, 256, 270

[56] References Cited

U.S. PATENT DOCUMENTS

| | | | |
|---|---|---|---|
| 4,624,687 | 11/1986 | Pere | 204/270 X |
| 5,211,828 | 5/1993 | Shkarvand-Moghaddam | 204/278 X |
| 5,399,251 | 3/1995 | Nakamats | 204/278 X |
| 5,888,361 | 3/1999 | Hirai et al. | 204/266 X |

*Primary Examiner*—Donald R. Valentine
*Attorney, Agent, or Firm*—Herbert L. Lerner; Laurence A. Greenberg; Werner H. Stemer

[57] ABSTRACT

A device for gasifying water conducted in a subsystem of a technical installation with hydrogen includes an electrolysis unit connected in the subsystem for decomposing some of the water conducted therein into hydrogen and oxygen, and a dissipation system connected to the electrolysis unit for dissipating oxygen received therefrom.

5 Claims, 1 Drawing Sheet

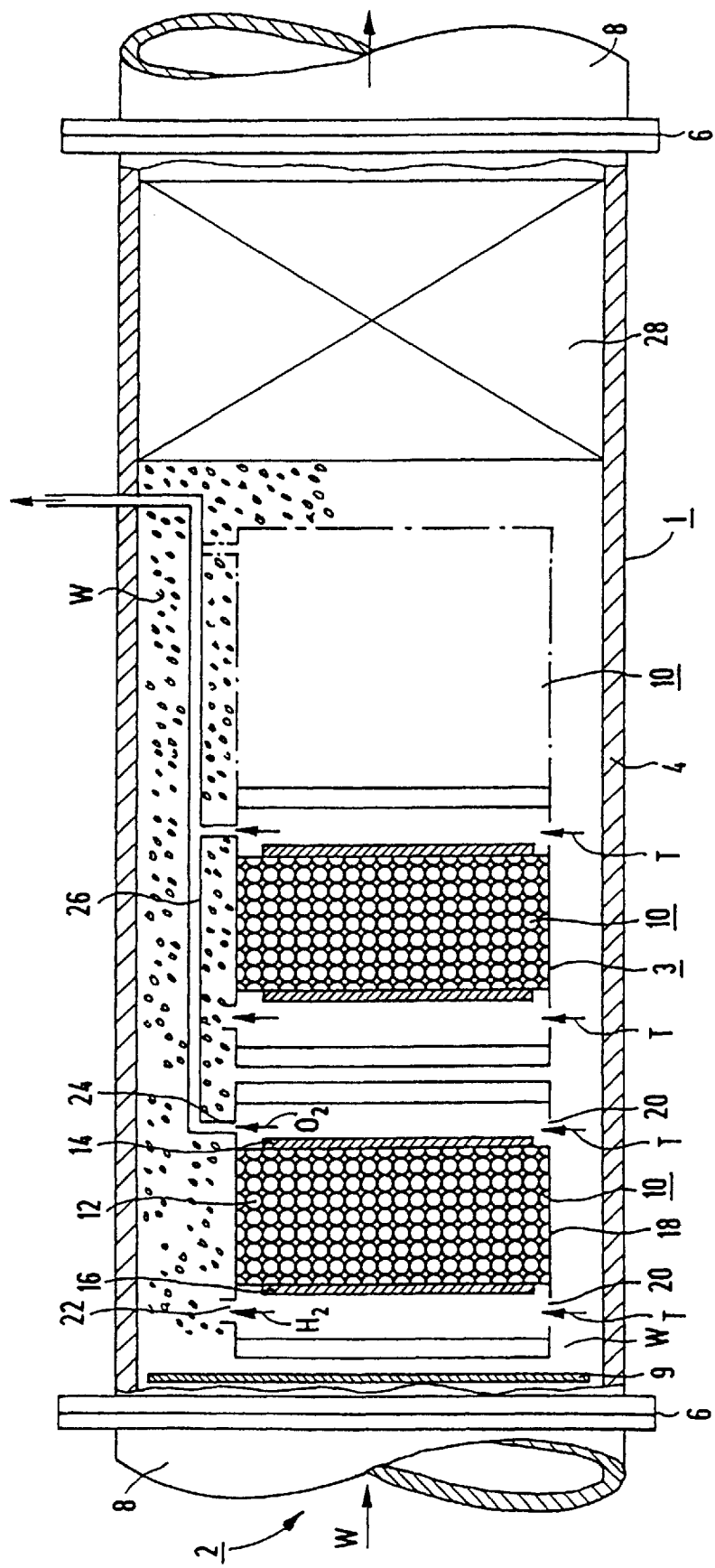

GASIFICATION DEVICE

CROSS-REFERENCE TO RELATED APPLICATION:

This is a continuation of copending International Application PCT/EP97/01333, filed Mar. 17, 1997, which designated the United States.

BACKGROUND OF THE INVENTION

FIELD OF THE INVENTION

The invention relates to a gasification device for gasifying, with hydrogen, water which is conducted in a subsystem of a technical installation.

Subsystems wherein water is conducted are provided in a multiplicity of technical installations, for example, in chemical manufacturing plants, as well as in nuclear or fossil-fuel operated power stations. A subsystem of this general type may be a cooling circuit or a circulation path for a working medium, for example. It may be necessary, for various reasons, to gasify with hydrogen or oxygen the water which is conducted in such a subsystem.

On the one hand, for example, a high oxygen concentration in the water which is conducted in the subsystem leads to corrosion of components or tubes in the subsystem. This can be suppressed by gasifying the water with hydrogen, because the hydrogen which is added to the water combines with the excess oxygen and thus reduces the oxygen concentration in the water.

Also when the subsystem is a primary cooling circuit of a pressurized water reactor of a nuclear power station, gasification with hydrogen is usually provided for the water which is conducted as cooling medium in this pressurized water reactor. In this case, the intention is thereby to counteract radiolytic decomposition of the medium flowing in the cooling circuit.

On the other hand, however, gasification with oxygen of the water which is conducted in a subsystem of a technical installation may also be necessary. This requirement arises, for example, in the case of a sewage treatment or clarification installation wherein the oxygen is added to the water for purification purposes.

A gas injection system is usually provided for gasifying, with hydrogen or oxygen, water which is conducted in such a subsystem. In this regard, a gas reservoir is usually connected via a pipe system to the subsystem to be supplied with hydrogen or oxygen, this reservoir being used to store a hydrogen and oxygen reserve, respectively. Such a gas injection system usually, however, includes a multiplicity of components, such as storage containers, pipelines or safety devices, for example, and is thus complex and susceptible to failure. Such an injection system for hydrogen must also be regularly checked for leakages, particularly due to possible formation of explosive gas mixtures if any hydrogen emerges or escapes from the injection system.

SUMMARY OF THE INVENTION

It is accordingly an object of the invention to provide a gasification device of the type mentioned in the introduction hereto, by which a rapid and exact adjustment of the hydrogen and oxygen content, respectively, of the water which is conducted in the subsystem is ensured in a particularly simple and reliable manner, and with low maintenance expenditure.

With the foregoing and other objects in view, there is consequently provided, in accordance with the invention, a device for gasifying water conducted in a subsystem of a technical installation, with hydrogen, comprising an electrolysis unit connected in the subsystem for decomposing some of the water conducted therein into hydrogen and oxygen, and a dissipation system connected to the electrolysis unit for dissipating oxygen received therefrom.

In accordance with another feature of the invention, the electrolysis unit includes a plurality of membrane electrolysis cells.

In accordance with a further feature of the invention, the gasification device includes a mixer through which the water conducted in the subsystem flows, the mixer being connected to the electrolysis unit downstream therefrom, as viewed in flow direction of the water conducted in the subsystem.

In accordance with an added feature of the invention, the gasification device includes a control system connected in the subsystem for adjusting pressure of the water to a predeterminable value, the control system being disposed downstream from the electrolysis unit, as viewed in flow direction of the water conducted in the subsystem.

In accordance with a concomitant feature of the invention, the gasification device includes an ion exchanger serving as a filter connected in the subsystem upstream of the electrolysis unit, as viewed in flow direction of the water conducted in the subsystem.

The invention is based upon the consideration that the transfer or travel paths for the hydrogen and the oxygen should be particularly short. The transfer paths can be suitably shortened by dispensing with central gas storage and by producing the hydrogen and the oxygen, respectively, directly at the location at which the gasification of the subsystem is to be provided. This can be achieved in a particularly effective manner by using some of the water, which is carried in the subsystem itself, to produce the hydrogen and the oxygen, respectively. This can be accomplished by suitable decomposition of the selected portion of the water into hydrogen and oxygen, the hydrogen produced in this regard, or the oxygen produced in this regard being introduced directly into the non-decomposed water which is being conducted in the subsystem. The dissipation system allows the gas which is produced from the decomposition of some of the water and which is not required for gasification of the water to be dissipated in a particularly simple manner, and to be supplied for any other purpose.

The electrolysis unit expediently comprises a plurality of membrane electrolysis cells. In the case of such a membrane electrolysis cell, the functional principle of a fuel cell, as is disclosed, for example, in the article "Brennstoffzellen fur Elektrotraktion" [Fuel Cells for Electrical Traction], K. Straßer, VDI Reports, No. 912 (1992), p. 125 et seq., is reversed. Thereto, water is supplied to a membrane, arranged between an anode and a cathode. Application of a supply voltage between the anode and the cathode decomposes the water electrolytically into hydrogen and oxygen. Such a membrane electrolysis cell is distinguished by a particularly compact construction, so that an electrolysis unit having a number of membrane electrolysis cells can be accommodated in a particularly confined space. Such an electrolysis unit can thus be connected into the subsystem particularly flexibly, and adjusted or matched to the specific requirements of the subsystem.

In order to ensure that the hydrogen and oxygen, respectively, which is fed into the water, dissolves particularly effectively therein, the electrolysis unit is advantageously connected upstream of a mixer through which the water in the subsystem flows.

Alternatively or additionally, a control system for setting a predetermined water pressure is advantageously connected downstream of the electrolysis unit in order to ensure that the gas which is to be fed into the water dissolves particularly well in the water. The dependency of the solubility of hydrogen or oxygen in water on the pressure of the water may thus be utilized in a particularly simple manner for the gasification system.

Furthermore, the electrolysis unit is expediently connected downstream of an ion exchanger, as a filter.

The advantages which are achieved by the invention are, in particular, that the gasification device which is connected in the subsystem allows production of the hydrogen or oxygen required for gasification of the water by decomposition of some of the water which is carried in the subcircuit, itself. No peripheral installations of a process-engineering nature are thus required for gasification of the subsystem with hydrogen or oxygen. In particular, no complex gas supply system, with corresponding pipelines, control devices and gas separators, is required.

There is no need for costly storage or unreliable transportation of the hydrogen and the oxygen, respectively, over long distances, so that maintenance tasks resulting therefrom are minimized. In addition, a plurality of gasification devices may be arranged in a decentralized manner on the subsystem, in a particularly simple way, due to the compact construction of the electrolysis unit, so that the production of the hydrogen and oxygen is particularly flexible and can be matched or adjusted to the existing requirements.

Other features which are considered as characteristic for the invention are set forth in the appended claims.

Although the invention is illustrated and described herein as embodied in a gasification device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

The single FIGURE of the drawing is a diagrammatic view of a gasification device for a subsystem of a technical installation, in accordance with the invention.

DESCRIPTION OF THE PREFERRED EMBODIMENTS

Referring now to the single FIGURE of the drawing, there is shown therein a gasification device 1 according to the invention which is provided for gasifying, with hydrogen $H_2$, water W which is conducted in only a fragmentarily illustrated subsystem 2 of a technical installation. The subsystem 2 may be, in this case, for example, a cooling water circuit of a chemical production shop, a water-vapor circuit of a power station, or a primary or secondary circuit of a nuclear power station. Alternatively, it may also be any other subsystem 2 of a technical installation in which water W is conducted.

The gasification device 1 includes an electrolysis unit 3 which is arranged in a pipe element 4. The pipe element 4, for its part, is connected via flanges 6 into a pipeline system 8 of the subsystem 2. Particularly when the subsystem 2 is a primary or secondary circuit of a nuclear power station, the pipeline system 8 is, in this regard, expediently a bypass line which can be shut off via nonillustrated valves.

In order to ensure a water purity level which is adequate for the operability of the electrolysis unit 3, the latter is connected downstream, as viewed in the travel direction of the water W, of an ion exchanger unit 9 serving as a filter element.

The electrolysis unit 3 is made up of a number of membrane electrolysis cells 10, each of which includes a membrane 12 formed of a polymer electrolyte arranged between an anode 14 and a cathode 16. For particularly high resistance to corrosion, the anode 14 and the cathode 16 are preferably formed of platinum or a platinum alloy. Alternatively, other materials may be provided therefor.

The anode 14 and the cathode 16 are connected to a voltage source in a conventional manner not otherwise illustrated in any greater detail. In order to control the hydrogen or oxygen production from the membrane electrolysis cells 10, the voltage source may be regulated as a function of or in accordance with a measured gas concentration level in the water W.

For each membrane electrolysis cell 10, the membrane 12 thereof, together with the anode 14 and the cathode 16 arranged thereon, is surrounded by a housing 18. The housing 18 of each membrane electrolysis cell 10 is formed with a number of inlet openings 20 for water W and a number of outlet openings 22 for hydrogen $H_2$. A drainage or dissipation system 26 passing through the pipe element 4 is connected to an oxygen or $O_2$-outlet opening 24 which is likewise formed in the respective housing 18 of each membrane electrolysis cell 10.

A mixer 28 is connected to the electrolysis unit 3 downstream therefrom, as viewed in the flow direction of the water W, as represented by the horizontal arrow. In addition or as an alternative, a control system for adjusting a predeterminable water pressure may be connected to the electrolysis unit 3, downstream therefrom.

During the operation of the gasification device 1, water W which is conducted in the subsystem 2 flows through the pipe element 4 which is connected into the pipeline system 8. Part of the flow of the water W, as symbolized by the arrows T, in this regard, passes through the inlet openings 20 into the membrane electrolysis cells 10. By applying a voltage to the anode 14 and the cathode 16 of each membrane electrolysis cell 10, the water W which is supplied to each membrane electrolysis cell 10 is decomposed into hydrogen $H_2$ and into oxygen $O_2$. The hydrogen $H_2$ passes through the outlet opening 22 into the water W which is being conducted in the subsystem 2, and is dissolved in this water W. In order to promote this dissolving process, the hydrogen $H_2$ and the water W are thoroughly mixed in the mixer 28. As an alternative or an addition, a water pressure, which may be predeterminable as a function of a nominal hydrogen content, can be adjusted in the water W via the control system. The oxygen $O_2$ which is produced during the decomposition of this partial quantity of water W is discharged via the drainage or dissipation system 26.

In the exemplary embodiment, the gasification device 1 is constructed for gasifying the water W with hydrogen $H_2$. Alternatively, however, the gasification device 1 may also be constructed for gasifying the water W with oxygen $O_2$. In this regard, the outlet opening 24 for the generated oxygen $O_2$ is not closed, so that the oxygen $O_2$ can penetrate directly into the water W. The outlet opening 22 for the generated hydrogen H2 is, in this regard, connected to the drainage or dissipation system 26.

Due to the compact construction of the membrane electrolysis cells 10, the gasification device 1 is connectable into the subsystem 2 of the technical installation in a particularly space-saving manner and, consequently, particularly flexibly. The hydrogen or oxygen production can thus be matched particularly flexibly to the requirements of the hydrogen or oxygen production, also by a variable arrangement of a plurality of gasification devices 1 in the subsystem 2.

I claim:

1. A device for gasifying water, conducted in a subsystem of a technical installation, with hydrogen, comprising:

an electrolysis unit connected in a subsystem of a technical installation for decomposing some of the water to be conducted in the subsystem into hydrogen and oxygen; and a dissipation system for dissipating oxygen received from said electrolysis unit.

2. The gasification device according to claim 1, wherein said electrolysis unit includes a plurality of membrane electrolysis cells.

3. The gasification device according to claim 1, including a mixer through which the water to be conducted in the subsystem flows, said mixer being connected to said electrolysis unit downstream from said electrolysis unit as viewed in a flow direction of the water to be conducted in the subsystem.

4. The gasification device according to claim 1, including a control system connected in the subsystem for adjusting pressure of the water to be conducted in the subsystem to a predeterminable value, said control system being disposed downstream from said electrolysis unit as viewed in a flow direction of the water to be conducted in the subsystem.

5. The gasification device according to claim 1, including an ion exchanger serving as a filter connected in the subsystem upstream of said electrolysis unit as viewed in a flow direction of the water to be conducted in the subsystem.

* * * * *

UNITED STATES PATENT AND TRADEMARK OFFICE
CERTIFICATE OF CORRECTION

PATENT NO. : 6,056,858
DATED : May 2, 2000
INVENTOR(S) : Kok Wai Cheah et al.

It is certified that error appears in the above-identified patent and that said Letters Patent is hereby corrected as shown below:

Title page,
Item [76], Inventors, change "Kok Wei Cheah" to -- Kok Wai Cheah --;
Change "Zhoongshan" to -- Zhongshan --
Change "Wan Han Zheng" to -- Wan Hua Zheng --

Item [57],
Amend the ABSTRACT as follows:
The present invention discloses the doping of rare earth elements into porous silicon, resulting in enhancement of luminescence. The doping is an electro-chemical process using constant voltage bias across the two electrodes in which the [anode] cathode is porous silicon and the [cathode] anode is platinum. The doping process involves a well-defined solution of electrolytes that controls the conductivity of the solution, and set values of constant voltages that selectively allow the desired rare earth elements being doped into porous silicon.

Signed and Sealed this

Seventh Day of May, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

| | |
|---|---|
| PATENT NO. | : 6,056,858 |
| DATED | : May 2, 2000 |
| INVENTOR(S) | : Anwer Puthawala |

It is certified that error appears in the above-identified patent and that said Letters Patent is hereby corrected as shown below:

This certificate supersedes certificate of correction issued May 7, 2002, the number was erroneously mentioned and should be vacated since no certificate of correction was granted.

Signed and Sealed this

Tenth Day of December, 2002

JAMES E. ROGAN
*Director of the United States Patent and Trademark Office*